(12) United States Patent
Ederer et al.

(10) Patent No.: US 7,955,537 B2
(45) Date of Patent: Jun. 7, 2011

(54) METHOD FOR CONSTRUCTING PATTERNS IN A LAYERED MANNER

(76) Inventors: Ingo Ederer, Hausen (DE); Rainer Höchsmann, Genderkingen (DE)

(*) Notice: Subject to any disclaimer, the term of this patent is extended or adjusted under 35 U.S.C. 154(b) by 0 days.

(21) Appl. No.: 12/463,664

(22) Filed: Jul. 7, 2009

(65) Prior Publication Data

US 2009/0261497 A1  Oct. 22, 2009

Related U.S. Application Data

(63) Continuation of application No. 10/516,386, filed as application No. PCT/DE03/01636 on May 20, 2003, now Pat. No. 7,531,117.

(30) Foreign Application Priority Data

Jun. 5, 2002 (DE) .................................. 102 24 981

(51) Int. Cl.
*B29C 67/00* (2006.01)
(52) U.S. Cl. ........................................ 264/113; 264/308
(58) Field of Classification Search .................. None
See application file for complete search history.

(56) References Cited

U.S. PATENT DOCUMENTS

| | | |
|---|---|---|
| 3,616,969 A | 11/1971 | Koizumi |
| 3,616,972 A | 11/1971 | Christy |
| 3,815,527 A | 6/1974 | Dobbins |
| 3,913,503 A | 10/1975 | Becker |
| 4,239,715 A | 12/1980 | Pratt |
| 4,247,508 A | 1/1981 | Housholder |
| 4,279,949 A | 7/1981 | Esser |
| 4,369,025 A | 1/1983 | Von Der Weid |
| 4,575,330 A | 3/1986 | Hull |
| 4,579,252 A | 4/1986 | Wilson et al. |
| 4,630,755 A | 12/1986 | Campbell |
| 4,665,492 A | 5/1987 | Masters |
| 4,669,634 A | 6/1987 | Leroux |
| 4,752,352 A | 6/1988 | Feygin |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |

(Continued)

FOREIGN PATENT DOCUMENTS

AU           720255        5/2000

(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner* — Mary Lynn F Theisen
(74) *Attorney, Agent, or Firm* — Dobrusin & Thennisch PC

(57) ABSTRACT

A process to produce models in layers is described, whereby a first material and then selectively a second material is applied in layers on a building platform and these two application stages are repeated until a desired pattern is achieved. The two materials form a solid if a suitable mixture ratio is used and the first material is a material mixture. The material mixture is at least partially prepared prior to each application stage.

18 Claims, 1 Drawing Sheet

U.S. PATENT DOCUMENTS

| | | |
|---|---|---|
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,221,539 A | 6/1993 | Pallerberg et al. |
| 5,248,456 A | 9/1993 | Evans et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams et al. |
| 5,482,659 A | 1/1996 | Sauerhoefer |
| 5,490,962 A | 2/1996 | Cima et al. |
| 5,506,607 A | 4/1996 | Sanders et al. |
| 5,518,680 A | 5/1996 | Cima et al. |
| 5,555,176 A | 9/1996 | Menhennett et al. |
| 5,573,055 A | 11/1996 | Melling et al. |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Wilkening et al. |
| 5,740,051 A | 4/1998 | Sanders, Jr. et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 5,965,170 A | 10/1999 | Matsuoka et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,094,994 A | 8/2000 | Satake et al. |
| 6,116,517 A | 9/2000 | Heinz et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,193,922 B1 | 2/2001 | Ederer |
| 6,217,816 B1 | 4/2001 | Tang |
| 6,258,170 B1 | 7/2001 | Somekh et al. |
| 6,259,962 B1 | 7/2001 | Gothait |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 * | 6/2002 | van der Geest ............... 264/113 |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,500,378 B1 | 12/2002 | Smith |
| 6,554,600 B1 | 4/2003 | Hofmann et al. |
| 6,582,613 B2 | 6/2003 | Mooneyham |
| 6,610,429 B2 | 8/2003 | Bredt et al. |
| 6,733,528 B2 | 5/2004 | Abe et al. |
| 6,764,636 B1 | 7/2004 | Allanic et al. |
| 6,830,643 B1 | 12/2004 | Hayes |
| 6,838,035 B1 | 1/2005 | Ederer et al. |
| 7,004,222 B2 | 2/2006 | Ederer et al. |
| 7,137,431 B2 | 11/2006 | Ederer et al. |
| 7,204,684 B2 | 4/2007 | Ederer et al. |
| 2001/0050031 A1 | 12/2001 | Bredt et al. |
| 2002/0026982 A1 | 3/2002 | Bredt et al. |
| 2002/0111707 A1 | 8/2002 | Li et al. |
| 2003/0083771 A1 | 5/2003 | Schmidt |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 * | 2/2004 | Patel et al. .................... 264/401 |
| 2004/0056378 A1 | 3/2004 | Bredt et al. |
| 2004/0094058 A1 | 5/2004 | Kasperchik et al. |
| 2004/0170765 A1 | 9/2004 | Ederer et al. |
| 2005/0017394 A1 | 1/2005 | Hochsmann et al. |
| 2005/0167872 A1 | 8/2005 | Tsubaki et al. |
| 2006/0105102 A1 | 5/2006 | Hochsmann et al. |
| 2006/0175346 A1 | 8/2006 | Ederer et al. |
| 2008/0001331 A1 | 1/2008 | Ederer |

FOREIGN PATENT DOCUMENTS

| | | |
|---|---|---|
| DE | 4300478 C1 | 8/1994 |
| DE | 4325573 | 2/1995 |
| DE | 29506204.5 | 4/1995 |
| DE | 4400523 | 7/1995 |
| DE | 4440397 | 9/1995 |
| DE | 0361847 | 11/1995 |
| DE | 29701279 | 1/1997 |
| DE | 19511772 C2 | 9/1997 |
| DE | 19723892 | 9/1998 |
| DE | 19853834 A1 | 11/1998 |
| DE | 19846478 | 4/2000 |
| DE | 10047614 | 4/2002 |
| DE | 10117875 | 1/2003 |
| DE | 10216013 A1 | 10/2003 |
| EP | 0711213 B1 | 5/1995 |
| EP | 0431924 B1 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0968 776 | 10/2002 |
| EP | 1415792 | 5/2004 |
| EP | 1442870 | 8/2004 |
| FR | 2790418 | 9/2000 |
| GB | 2382798 | 6/2003 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | WO 00/51809 | 9/2000 |
| WO | WO 01/26885 | 4/2001 |
| WO | WO 01/72502 A1 | 4/2001 |
| WO | WO 01/34371 * | 5/2001 |
| WO | WO 02/26419 | 4/2002 |
| WO | WO 02/26420 | 4/2002 |
| WO | WO 02/26478 | 4/2002 |
| WO | WO 02/28568 | 4/2002 |
| WO | WO 02/064353 | 8/2002 |
| WO | WO 02/064354 A1 | 8/2002 |
| WO | WO 02/083323 | 10/2002 |
| WO | WO 03/016030 | 2/2003 |
| WO | WO 03/016067 | 2/2003 |
| WO | WO 03/086726 | 10/2003 |
| WO | WO 03/103932 A1 | 12/2003 |
| WO | WO 2004/010907 | 2/2004 |
| WO | WO 2004/112988 | 2/2004 |
| WO | WO 03/097518 | 6/2005 |
| WO | WO 2005/080010 | 9/2005 |
| WO | WO 2005/113219 | 12/2005 |

OTHER PUBLICATIONS

Copending National Phase Application, WO 02/26419, Apr. 4, 2002.
Copending National Phase Application, WO 02/26420, Apr. 4, 2002.
Copending National Phase Application, WO 02/26478, Apr. 4, 2002
Copending National Phase Application, WO 02/28568, Apr. 11, 2002.
Copending National Phase Application, WO 02/083323, Oct. 24, 2002.
Copending National Phase Application, WO 03/086726, Oct. 17, 2005.
Copending National Phase Application, WO 03/097518, Jun. 24, 2005.
Copending National Phase Application, WO 04/112988, Dec. 8, 2005.
EOS Operating Manual for Laser Sintering Machine with Brief Summary, Feb. 2000.
Gephart, Rapid Prototyping, pp. 118-119, 1996.
International Search Report, PCT/DE00/03324, Jun. 5, 2001.
International Search Report, PCT/DE01/03661, Feb. 28, 2002.
International Search Report, PCT/DE01/03662, Mar. 1, 2002.
International Search Report, PCT/DE02/01103, Sep. 30, 2002.
International Search Report, WO 04/110719, Jan. 11, 2005.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
Sachs et al., "Three-Dimensional Printing: Rapid Tooling and Prototypes Directly from a CAD Model", Massachusetts Institute of Technology, pp. 143-151.
Sachs et al., Three-Dimensional Printing: Rapid Tooling.
Non-Patent Literature and Prototypes Driectly from a CAD Model, Massachusetts Institute of Technology, pp. 131-136.
Williams, "Feasibility Study of Investment Casting Pattern Design by Means of Three Dimensional Printing", Department of Machanical Enginerring, pp. 2-15, Jun. 5, 1989.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
US 4,937,420, 06/1990, Deckard (withdrawn)

* cited by examiner

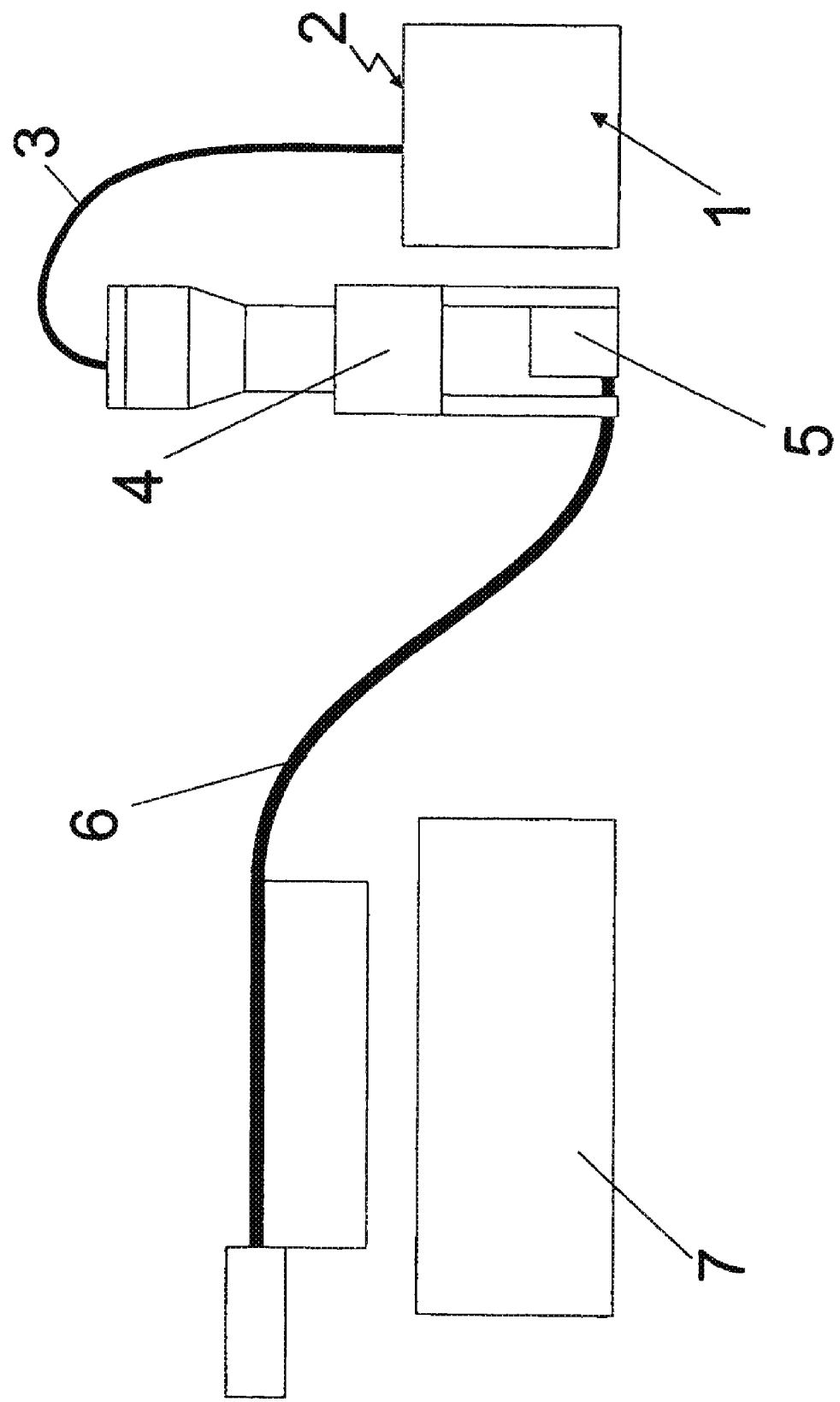

METHOD FOR CONSTRUCTING PATTERNS IN A LAYERED MANNER

CLAIM OF BENEFIT OF FILING DATE

The present application is a continuation application of application Ser. No. 10/516,386, filed Nov. 30, 2004 (371 date of Jan. 4, 2005), which claims the benefit of the priority of Application No. PCT/DE03/01636 (Published as WO03/103932), filed on May 20, 2003, and Germany 10224981.4 with a filing date of Jun. 5, 2002, all of which are incorporated herein by reference for all purposes.

The invention as described here refers to a process of layer-by-layer configuration of patterns and/or moulds in accordance with the generic term of the patent claim 1.

The application of the rapid prototyping process is well-known as state-of-the-art technology in the production of casting moulds or casting patterns without the use of tools.

A rapid prototyping process to configure casting patterns in particular is already familiar from DE 198 53 834 A1, for example. In this process untreated particulate material, such as quartz sand, is applied on a building platform in a thin layer. Then with the aid of a spray appliance a binding agent is sprayed onto the entire particulate material as thinly as possible. Subsequently a curing agent is applied to selected areas, as a result of which designated areas of the particulate material are solidified. After several repetitions of this process an individually moulded body can be produced from the bonded particulate material. This body is initially embedded in the surrounding unbonded particulate material and can be removed from the bed of particulate material after the construction process has been completed.

If, for example, in this type of rapid prototyping process a quartz sand is used as particulate material and a furan resin as binding agent, with the aid of a sulphurous acid used as curing agent a casting mould can be produced, which is made of the materials usually used in the mould production process and therefore consists of materials known to the expert.

With such rapid prototyping processes, as already described, first the particulate material, then the binding agent and thereafter the curing agent must be applied. This requires a threefold application of materials for every layer and is therefore very time-consuming.

There have been attempts for quite some time to eliminate at least one coating process to shorten the production time of the pattern.

EP 0 711 213 B1, for example, describes a further rapid prototyping process namely selective laser sintering. In this case the particulate material used is croning sand, that is hot-coated foundry sand with resol or novolack resin. This means that only the particulate material containing resin must be applied and the application of the binding agent is superfluous. Traditional foundry materials can also be used in this process and with these existing casting patterns can be produced from the usual materials familiar to the expert.

However, this production process also has considerable disadvantages. The resin in the sand is not completely hardened during the exposure process. This leads to a reduced so-called green part rigidity of the produced moulds. The desired rigidity is reached only after removal of the loose sand and a subsequent oven process. Apart from the additional process step in the oven there is a high risk of breakage while desanding and handling the "green parts". During the oven process an undesired distortion of the components can also occur.

Furthermore croning sands have a relatively high thermic stability, which leads to a poor de-coring capability at the relatively low casting temperatures associated with light alloy casting.

For selective laser sintering croning sands with a higher binder content are also necessary. The consequence of this are larger quantities of gas during the pyrolysis of the binder while casting and therefore a higher reject risk due to blowholes in the component.

Moreover selective laser sintering in general has the disadvantage that the laser is a complex technique and in addition the exposure phase is also relatively time-consuming.

Furthermore only a very limited choice of sand types and grain sizes are available for selective laser sintering, which means that this process is also not very flexible.

A so-called 3D printing process is familiar from the patents U.S. Pat. No. 5,204,055 and also EP 0 431 924 B1. This entails the selective adhesion of particulate material by the addition of binding material. This process has an advantage over selective laser sintering in that it is based on a cost-effective printing technology.

It must be said that, because of the unfavourable material properties, typical traditional foundry binders can be administered only with great technical effort. There is also a danger that the nozzles used to measure out the binding agent become clogged and unusable.

Using a drop dispenser to administer the binding agent makes the mixing of the binder in the component very poor. In order to reach comparable rigidities as with conventionally mixed sands, much higher quantities of binder must be added, which again leads to problems in casting because of the higher quantities of gas.

In PCT/DE00/03324 a further 3D printing process is revealed. This is a selective printing of particles mixed with binder with an activator, to which a gas curing device is connected.

Again it is advantageous that here traditional foundry materials can be used.

However, gas curing is very elaborate for this process. Materials which create a health hazard such as $SO_2$ are partly necessary, meaning that a very large amount of equipment is required and the safe operation of the apparatus becomes very costly.

As prior to the curing process not even the slightest solidification of the component takes place, slight displacement of the powder bed while layering can lead to the destruction of the entire component.

A further 3D printing process is familiar from DE 197 23 892 A1. This is a selective printing using particles coated with binder, so-called croning sand, with a moderating agent. This is again followed by curing which, according to the disclosure in this publication, takes place by way of radiation. This process also has the advantage of being able to use traditional foundry materials. However, curing of the components is very complex in this process too, because the necessary narrow tolerance in the change of temperature requires an extensive use of equipment.

In the process published in DE 198 53 834 A1, again a 3D printing process, a selective printing of particles sprayed with binder with curing agent takes place. Here too traditional foundry materials can again be used with some degree of flexibility.

The disadvantages of this process include the complex spray application of the binder, inhomogeneous binder mixing and the high concentration of binder in the component.

Moreover, due to the formation of mist in the building chamber caused by the spraying process, a high degree of soiling of the apparatus is consequently caused. As a result an elaborate cleaning of the print head is necessary, as otherwise a hardening of the material on the nozzles occurs and causes its destruction.

Similar disadvantages are illustrated in the selective printing of untreated sand with binding and curing agent, as described in WO 01/72502 A1.

Given this situation, it is the task of the invention as set out here to make available a process whereby it is possible to carry out layer-by-layer configuration of patterns in the most time-saving and cost-effective manner. Furthermore the process should be able to be used industrially based on its reliability and user-friendliness.

This task is solved by implementing a process for the configuration of patterns in layers, whereby using a building platform, a first material and then selectively a second material are each applied in layers and these two application steps are continually repeated until a desired pattern is achieved. To this end, the two materials form a solid, provided a suitable mixture ratio is used. The first material concerned is a material mix and is at least partially prepared prior to each layer stage.

This process has proved itself to be advantageous, as it means that the processing times of the material mixture can be kept short and therefore the slightly volatile ingredients in the binding agent are retained. The preparation can take place as required during the application process.

It would however also be possible to mix the total necessary amount of material required for the process in advance; very elaborate measures would however have to be taken in order to prevent the vaporization of volatile components in the binder. Indeed, it is this highly elaborate use of equipment that this process intends to avoid.

A further advantage of this so-called "in-process" mixing is also the greater degree of flexibility. Firstly, only so much sand is mixed as is actually required. This means that, should the process be completed early, there will be no unnecessary wastage. If the building process is prolonged by additional loading of components, there is no danger of shortage of material due to the initial predetermined quantity of material. Furthermore the sand and the component materials can even be altered during the process. Therefore, in contrast to the selective laser sintering process, the user does not have decide at the beginning of the process on a specific type of material for the entire building process.

A further advantage of this process in comparison with selective laser sintering is the use of cost-effective raw materials in contrast to expensive special types of sand. In accordance with a preferred embodiment of this invention, the material mixture is prepared continually. This means that the mixture is always round about the same "age" and therefore has the same properties in respect of any components etc. which may have evaporated In accordance with a further preferred embodiment of the invention process, the material mixture is prepared in batches. A continual mixing process, as is usual in conventional moulding processes, would in fact also be possible, but because of the relatively low processing speed during the layer configuration technically complicated.

Preferably the material mixture should consist of a particulate material and a reactive material.

If in the invention process the second material, in accordance with a further preferred embodiment, contains an activator, then bonding of the components at room temperature by way of a chemical reaction can take place.

For this it would be possible for the curing of the bonded material to occur because of a chemical reaction of the materials. Equally, curing through a physical reaction between the materials would also be conceivable.

Preferably with the invention process the repeated layer application and the application of the second material takes place within the time required for solidification of the two materials. Thus a solidification within the surface section and to the layer below and therefore a better layer bonding can be achieved.

Particularly good results could be achieved when, in the preparation of the material mixture, a residual porosity remains, as this is accompanied by an increased gas permeability, which has a favourable effect during casting. Moreover the second material then also reaches deeper-lying particles, which results in better curing.

In accordance with a preferred embodiment of the invention process the second material is applied by means of droplet production technique. This technology has proved itself to be very accurate, reliable and simple.

An application of the second material by using a dispensing technique would, however, also be conceivable.

Particularly good results could be achieved when the second material has a carrying agent which is not involved in the curing agent reaction, as with such a substance the wetting of the material mixture made up of particulate material and the first reactive components can be adjusted independently of the chemical quantity ratios necessary for reaction.

There is still a desire to be able to process varying layer thicknesses. This also means that the addition of curing agent must be adjusted for each layer and that preferably independently from the chosen dissolution of the curing agent application.

For this reason a non-reacting carrying agent is mixed with the curing agent, with the help of which the required quantity ratio can be adjusted.

Preferably ethanol is used as a carrying agent. However, other alcohols could also be used, even water is a possible alternative. Ethanol is favourable because it is slightly volatile. If possible, however, volatilization of the entire carrying agent should have occurred prior to casting, as it can have a negative effect on the casting. During the process itself a large part of the ethanol already evaporates from layer to layer. The residual amount can be evaporated in a brief oven process (1 h at over 80° C.).

Ethanol also has two other positive effects. The viscosity of the agent to be dispensed is a limiting factor with the DOD (drop-on-demand) record heads. With ethanol the viscosity of the curing agent can be reduced, which improves the functioning of the print heads.

Without a diluent a curing agent quantity to be dispensed adapted to the chemical quantity ratio would be so low that a locally severely limited curing process must be assumed. Moreover at this point an excessive addition of curing agent would take place, which would have a negative effect on the chemical reaction and this would in turn have negative effects on the rigidity of the components.

The carrying agent quantity can be calculated mathematically:

Given the desired proportional mass of the curing agent in the particulate material is $x_h$,
the particulate material weight per layer is $m_{s,1}$
then the necessary curing agent quantity $m_h$ is calculated as follows:

$$m_h = m_s \cdot x_h$$

Given additionally that the required printing resolution is $r_p$ in dpi,
the volume of the liquid particles is $v_{f,d}$,
the area of the building surface is $A_b$,
the density of the curing agent is $\rho_h$,
then the proportional volume of the carrying agent $x_t$ can be calculated $$x_t = \frac{m_h}{\left(\frac{r_p}{0.0254}\right)^2 \cdot v_{f,d} \cdot A_b \cdot \rho_h}$$

If the particulate material used is a moulding sand such as quartz sand, silicate sand, chromite sand, zircon sand, olivine sand, chamotte sand, corundum sand or/and carbon sand, good results can be achieved with the models. Newer materials such as synthetic sands, for example cerabeads, can demonstrate advantages in special applications and can be similarly used. These particulate materials can be used on their own or as a mixture.

Equally it would be conceivable in respect of this invention that the particulate material is made up of a polystyrene powder, a polyamide powder or other polymer particulate materials, or a mixture of these powders.

A furan resin and/or a phenol resin are particularly suitable for the first reactive material.

The components produced in accordance with the invention can be used preferably as moulds for non-ferrous castings or in the production of investment patterns for non-ferrous castings.

In accordance with the invention the particulate material, preferably quartz sand, is mixed with a small proportion of epoxy resin (binder) and in the case of furan and phenol resins with a curing agent in predetermined quantities either in batches or mixed continually and subsequently made into a mould. Typical mixture proportions are between 0.6 and 1.8 weight-% content of resin in the quartz sand.

Conventionally the production of the mould usually takes place in a moulding machine using a pattern to achieve the moulding; production of the mould also partially takes place by hand. The curing, that means the bonding of the sand particles to a firm shape then takes place chemically or physically by curing the binder. The hardening process can be supported by the use of heat.

Once the mould is finished it is then prepared for casting. Usually several mould components such as upper and lower box and cores are assembled. If required the mouldings are then sized. Then the liquid metal in poured into the designated sprue. The high temperature of the heat melting bath leads to cracking of the resin content of the sand, especially of the outer parts nearest the heat melting bath. The gas which forms during this process is led away via the porosity of the sand to the exterior.

In order to avoid undesired gas cavities, the binder concentration in the mould should be as low as possible. However, the proportion of binder should be adequate enough to guarantee the mechanical stability of the mould, even under the pressure of the metal heat melting bath. Moreover, the particles should be bonded until the metal has cooled down at least on the outer zone, and a so-called casting skin has formed.

After the metal has set, the sand should ideally trickle out of the mould, if possible without the influence of any further heat application or mechanical aids.

The declared aim, therefore, for the production process in layers as envisaged in the invention is to administer as little binder as possible but nevertheless an adequate amount in the particulate material.

Further advantageous variations of the invention as laid out here can be found in the dependent claims and the description as set out below.

To provide a more detailed explanation the invention is described hereafter in more detail by using preferred examples of implementation and by reference to the drawing.

In the drawing the only FIGURE illustrates the pre-mix and supply of the pre-mixed material.

As an example, the invention process and the invention apparatus for use in a layered configuration of casting moulds made of particulate material, in this case foundry sand, binder and curing agent, is to be described hereafter in a rapid prototyping process.

The foundry sand mixed with binder during the application stages is applied on a platform in a thin layer (ca. 0.15-0.3 mm layer thickness). During the next stage the curing agent is selectively printed on to predetermined areas of the sand by means of a print head. This need not necessarily be performed this way, but could also be carried out by means of another dosage, as for example by way of a screen printing process or something similar.

Wherever the curing agent penetrates into the sand, a chemical reaction is set off and the particles bond together locally, in fact only on the exact spots where curing agent was applied. No reaction takes place in the remaining areas, Quartz sand mixed with binder therefore remains unbonded. During the next stage the building platform is lowered correspondingly to the amount of the layer thickness and the process consisting of application of the pre-mixed sand and pressing with curing agent on to predetermined areas begins again. This process loop is repeated until the desired construction height has been reached and the component has been completed. This now lies embedded in the uncured sand and only has to be removed from the surrounding sand.

In this example a traditional foundry resin from the family of furan resins is used as a binder. Other resins like, for example, phenol resins or also PU resins could also be used.

The particulate material combined with binder is mixed in batches during the building process. Here care must be taken that the batch is processed as quickly as possible because of the slightly volatile but reactive components in the resin. A large proportion of the resin consists of furfuryl alcohol, which has a very high vapour pressure even at room temperature. In order to avoid an unwanted reduction of these constituents in the resin, attention should be paid to the timely processing of the material.

The quantity of binder can be varied and is preferably in the region of 0.6-1.5 weight-% of the untreated particulate material.

The curing agent chosen is a sulphurous acid, as set out in the example described. For an optimum chemical reaction with the binder the proportion of the sulphurous acid should be in accordance with the binder manufacturer's instructions, within a range of between 30% and 50 weight % of the binder quantity. Given these binder weight proportions this means that ca. 0.18-0.75 weight % of the sand should be dosed.

With the invention process the percentage amounts of the curing agent present in the mixture have an influence which cannot be disregarded. If too little curing agent is put on the sand layer previously mixed with binder, the reaction is delayed or, if the quantity falls short of the required minimum, the process will not begin at all.

If, by contrast, too much curing agent is introduced the component may overcure. In this case too the component produced rapidly loses its rigidity.

Furthermore it is important for the curing agent to reach as many areas of contact of the particle as possible, setting off the chemical reaction with the binder. Also a decisive factor is that the curing agent is well distributed in the particulate material. A localised curing agent overdosage cannot be compensated over the surface and leads to a reduction of the rigidity.

Therefore it is important that the whole desired area is printed by the curing agent in adequate quantities and as evenly as possible.

The quantity of curing agent must therefore be adapted to the layer volume and the binder concentration. A quantity regulation via the DOD print heads is only possible to a limited extent.

With these systems the drop size is in fact relatively rigid as it is determined by the configuration design of the printer. Typically the drop diameter of the curing agent can be selected within a range of 10 μm-ca. 200 μm. In our case the drops have a volume of 180 pl. Moreover the number of drops is determined by the desired resolution. This means that if the amount of curing agent added is adjusted by altering the number of drops, the quality of the produced components, which is to a considerable extent determined by the print resolution, will suffer. In a worse-case scenario the drops must be placed so far from each other that the homogeneity of the curing agent added is no longer sufficient to cure the binder over the total desired surface. The rigidity of the component would be considerably reduced because of this.

The problems associated with the drop size and drop quantity are increased by the desire to be able to process varying layer thicknesses. This also means that the amount of curing agent added has to be adjusted for each layer and this preferably independently of the chosen dissolution.

For this reason a non-reactive carrying agent is mixed with the curing agent, with the aid of which the desired quantity ratios can be more easily adjusted. As in the example described here the non-reactive carrying agent is ethanol.

In the example described here the quantity of carrying agent is calculated as follows:

The quartz sand weight per layer is 315 g;
The proportional mass of the binder in the quartz sand $x_b$ is 1.0 weight-%;
The proportional mass of the curing agent in the quartz sand $x_h$ is 0.5 weight-%;
This results in a calculated curing agent quantity in the layer of 1.58 g;
The desired print resolution $r_p$ is 150 dpi,
the drop volume $v_{f,d}$ is 180 pl,
the area of the building surface $A_b$ is 1.125 m$^2$,
the density of the curing agent $\rho_h$ is 1,206 kg/l,
This results in a proportional volume of the curing agent to the total dosage quantity of 18.5%.

It is described with reference to the FIGURE how the pre-mixing and the supply of the pre-mixed material to the coating machine in accordance with a preferred embodiment can take place.

For this purpose a specified quantity of untreated particulate material 1 is taken from a so-called big bag 2 and led via a conveyor belt 3, e.g. a pneumatic conveyor, to a mixer 4. This mixer mixes the particulate material 1 in the mixing chamber, e.g. by way of a rotating impeller as per the prescribed mix design with the resin binder and leads the batch received to a so-called receiver tank 5. The receiver tank 5 is fitted with a level sensor and activates the mixing process when underfilled. If in addition there is to be an electromechanical vibrator at the receiver tank, bridging in the quartz sand, which is a frequent problem, can thus be avoided or at least considerably reduced.

The particulate material pre-mixed as described, which is now slightly sticky, is conveyed via a spiral conveyer 6, depending on the requirement of the coater 7 to this piece of equipment.

This described system excels in that it is fully automated and, given the necessary particulate material supply, can be operated without interruption in continuous operation mode.

The invention claimed is:

1. A process for producing patterns in layers on a building platform, comprising:
providing a first particulate material;
providing a first reactive component;
mixing the first particulate material and the first reactive component as needed during the producing process to form a first material mixture, wherein a residual porosity remains in the first material mixture;
applying the first material mixture to the building platform;
providing a second material, the second material comprising a reactive component, wherein the second material comprises a furan resin and/or a phenol resin and is applied by a droplet production technique;
applying the second material selectively onto the first material mix creating a layer and thus causing a chemical reaction that beings to solidify the combination of the first material mixture and the second material wherein processing times of the material mixtures are kept short so that any slightly volatile ingredients in the second material are retained;
repeating the applying steps within a time period before the chemical reaction completely solidifies the previous layer;
repeating the above steps until a pattern is produced; and
evaporating the residual slightly volatile ingredients;
wherein the first reactive component includes a carrying agent and volatilization of the entire carrying agent occurs prior to being used as a casting mold.

2. The process according to claim 1, wherein the first particulate material is quartz sand, silicate sand, chromite sand, zircon sand, olivine sand, chamotte sand, corundum sand, carbon sand, or any combination thereof.

3. The process according to claim 1, further including a step of adjusting addition of a curing agent for each layer.

4. The process according to claim 1, wherein the second material further comprises a reactive component, and a non-reactive carrying agent, wherein the non-reactive carrying agent reduces a viscosity of the second material mixture.

5. The process according to claim 1, wherein the drop diameter of the second material is within a range of 10 μm to 200 μm.

6. The process according to claim 2, wherein the reactive component allows for the chemical reaction to occur at room temperature.

7. The process according to claim 1, wherein the carrying agent acts as a wetting agent, wetting the first material mixture.

8. The process according to claim 1, wherein the carrying agent is ethanol.

9. The process according to claim 1, wherein the first reactive component is an acid.

10. The process according to claim 1, wherein the chemical reaction takes place at room temperature.

11. The process according to claim 1, wherein the evaporating occurs in an oven at over 80° C.

12. The process according to claim 3, further including the step of reducing a viscosity of a curing agent with ethanol.

13. The process according to claim 1, wherein the first particulate material is made up of a polystyrene powder, a polyamide powder, or other polymer particulate materials, or a mixture of these powders.

14. The process according to claim 1, wherein the layer is 0.15 to 0.3 mm in thickness.

15. A process for producing patterns in layers on a building platform, comprising:
   providing a first particulate material;
   providing a first reactive component, wherein the first reactive material is a furan resin and/or a phenol resin;
   mixing the first particulate material and the first reactive component as needed during the producing process to form a first material mixture, wherein a residual porosity remains in the first material mixture;
   applying the first material mixture to the building platform;
   providing a second material, the second material comprising a reactive component;
   applying the second material selectively onto the first material mix creating a layer and thus causing a chemical reaction that beings to solidify the combination of the first material mixture and the second material;
   repeating the applying steps within a time period before the chemical reaction completely solidifies the previous layer; and
   repeating the above steps until a pattern is produced,
   wherein processing times of the material mixtures are kept short so that any slightly volatile ingredients in a binding agent are retained.

16. The process according to claim 15, wherein the second material is applied by a droplet production technique.

17. The process according to claim 15, wherein the second component includes a carrying agent and volatilization of the entire carrying agent occurs prior to being used in a casting step.

18. The process according to claim 15, further including the step of evaporating any residual slightly volatile ingredients in an oven.

* * * * *

UNITED STATES PATENT AND TRADEMARK OFFICE
CERTIFICATE OF CORRECTION

| | | |
|---|---|---|
| PATENT NO. | : 7,955,537 B2 | Page 1 of 1 |
| APPLICATION NO. | : 12/463664 | |
| DATED | : June 7, 2011 | |
| INVENTOR(S) | : Ederer et al. | |

It is certified that error appears in the above-identified patent and that said Letters Patent is hereby corrected as shown below:

On title page

Page 2, U.S. Patent Documents, Column 1, "5,196,062" is missing from patent.

Page 2, Foreign Patent Documents, Column 2, "DE 0361847" should read:
--EP0361847--.

Page 3, Other Publications, Column 1, "Copending Patent Application, 11/767,778, filed June 25, 2007 (1156-014) (Published as 2008-0001331)" and "Copending Patent Application, 10/866,205, (1156-006) (Patent Published as 2005-0017394)" are missing from patent.

Signed and Sealed this
Sixteenth Day of August, 2011

David J. Kappos
*Director of the United States Patent and Trademark Office*